Aug. 24, 1965 PER-CHRISTIAN ISAKSEN 3,202,258
ARRANGEMENT OF ROLLERS FOR CONVEYORS
Filed July 1, 1963
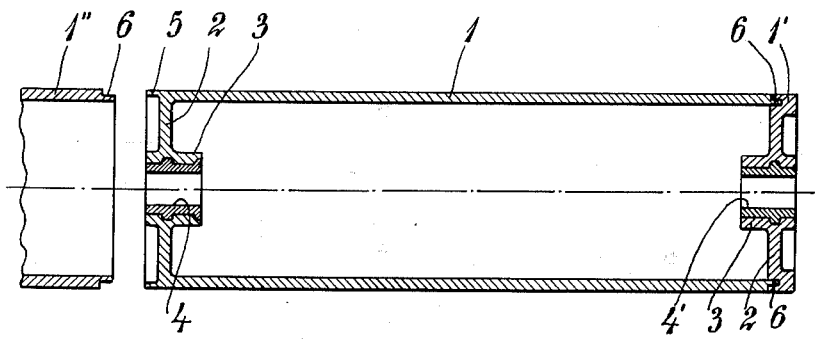
INVENTOR
Per-Christian Isaksen
BY
Nolte & Nolte
ATTORNEYS 3,202,258
ARRANGEMENT OF ROLLERS FOR
CONVEYORS
Per-Christian Isaksen, Postboks 108,
Fredrikstad, Norway
Filed July 1, 1963, Ser. No. 292,059
Claims priority, application Norway June 29, 1962
5 Claims. (Cl. 198—1)

This invention relates to an arrangement of conveyor rollers of the type that consists of a cylindrical, hollow body provided with bearings at the ends for the insertion therethrough of a shaft and suitable fastening between the side frames in a transport path. Such transport paths are employed, for example, in breweries.

In known conveyors, several different widths are to be found. For every individual plant, rollers have had to be made with a length that suited the width of the side frame.

The aim of the invention is to construct rollers for conveyors in which rollers are built together from elements in such a way that by suitable dimensioning of these standard elements one can make rollers for conveying plants of a desired length, which rollers are then applicable for the different widths of said frames for transport paths.

According to this invention this objective is attained by letting each roller consist of one or more axially assembled standard roller elements, each of which, prior to assemblage, consists of a cylindrical, hollow body provided at one end with an end wall in which a bearing is embedded, while the other end is open.

A better understanding of the invention may be obtained from an examination of the accompanying drawing.

Each transport roller element consists of a hollow cylinder 1, open at one end, while the other end is provided with an end wall 2, in which a central bearing 3 with bearing liner 4 is formed.

The cylinder 1, the end wall 2 and the bearing 3 are preferably made as a unit of plastic, for example ABS (acrylonitrile, butadiene and styrene copolymer) or PVC (polyvinyl chloride). The bearing liner 4 is embedded in the bearing 3 and is secured by grooves in the bearing in the usual way. The bearing liner 4 can be made of acetal resin or nylon.

The end edges 5, 6 of the cylinder body 1 can be shaped as seen in the drawing, whereby the edges are well fitted and fastened to further roller elements, for example 1" in the drawing, which are arranged co-axially with the element 1. The end edge 6" of the element 1" will, as it is seen, fit into the end edges 5, and connection between the two elements can then take place by glueing and/or welding.

In the example shown in the drawing the right, open end of the element 1 is provided with a bearing 3', 4' which is part of a separate standard element 2' fastened to the end edge 6.

It will be seen that by the shown and described shaping of standard elements for production of transport rollers according to the invention, one can by simple means assemble desired lengths of transport roller elements to ready transport rollers of any desired length. Each element then has bearings only at one end, but can by the described assemblage of further elements or parts thereof provide necessary bearings at the other end as well.

It will be understood that the embodiment shown in the drawing and described above can be varied in many ways regarding detailed design without falling outside the frame of the invention. Thus the end edges of the cylinder bodies may be given another suitable shape for fitting, and the separate fastening elements that are fitted in the open tube ends may also be given a suitable shape which provides the desired fastening and support.

I claim:
1. A roller which is adapted to form one of a plurality of rollers of a roller conveyor in which said plurality of rollers are respectively mounted for free rotation on a plurality of parallel shafts, said roller comprising a plurality of identical roller elements coaxially arranged with respect to each other in end-to-end relation and fixed to each other to form said roller from said plurality of roller elements, whereby a roller of a given length can be built up from a selected number of said elements, each of said elements having a hollow interior and including an elongated tubular member open at one end and carrying at its other end a transverse end wall formed with a central opening for receiving a shaft of the conveyor so that the open end of one element can be fixed to the end of the next element which carried said end wall while the roller will be supported for rotation at the central openings of the plurality of end walls of said elements, said end wall having an end portion adapted to be joined to the end portion of the next roller element at the open end of the latter, and a closure plate closing the open end of that one of said elements which is situated at the end of said plurality of elements and does not have its open end closed by another element, said closure plate also being formed with a central opening through which the shaft which supports the roller is adapted to pass, so that closure plate will also participate in the support of said roller for rotary movement, and said closure plate having an exterior diameter equal to the exterior diameter of said roller elements.

2. A roller as recited in claim 1 and wherein said end wall has an end flange projecting slightly therefrom and forming an end portion adapted to be joined to the end portion of the next roller element at the open end of the latter, and one of said end portions having a reduced diameter to be nested into the other of said end portions.

3. A roller as recited in claim 2 and wherein the reduced end portion is situated at the open end of each element and wherein said flange has a thickness less than the remainder of the wall thickness of each element and an outer diameter equal to that of the remainder of said element so that the reduced diameter of each element at its open end is nested into said flange to be joined therewith.

4. A roller as recited in claim 3, and wherein said closure plate is formed with a groove for receiving the end portion of reduced diameter at said open end of said end element.

5. A roller as recited in claim 1 and wherein each end wall has at its central opening an elongated tubular portion coaxial with the outer wall of each element to form a bearing of substantial area for the shaft, and said closure plate also having at its central opening an elongated tubular portion forming a bearing of substantial area.

References Cited by the Examiner
UNITED STATES PATENTS

| | | | |
|---|---|---|---|
| 857,370 | 6/07 | Waechter | 198—192 |
| 1,759,220 | 5/30 | Brown | 198—127 |
| 2,892,533 | 6/59 | Lo Presti. | |

SAMUEL F. COLEMAN, Primary Examiner.
WILLIAM B. LABORDE, Examiner.